United States Patent [19]

Goff

[11] Patent Number: 4,460,189
[45] Date of Patent: Jul. 17, 1984

[54] MULTI-DIRECTIONAL PORTABLE HAND TRUCK

[76] Inventor: Frederick Goff, P.O. Box 671, Travelers Rest, S.C. 29690

[21] Appl. No.: 381,356

[22] Filed: May 24, 1982

[51] Int. Cl.³ .............................................. B62B 1/12
[52] U.S. Cl. .................................... 280/47.27; 280/646
[58] Field of Search ...................... 280/47.11, 40, 47.2, 280/47.27, 47.12, 47.18, 79.1 A, 47.24, 47.21, 646, 63; 180/209; 414/490, 444; 16/18 R, 18 A, 45, 46; D12/204; D8/375

[56] References Cited

U.S. PATENT DOCUMENTS

| | | | |
|---|---|---|---|
| D. 56,583 | 11/1920 | Chalupa | D8/375 |
| D. 192,596 | 4/1962 | Rice | D8/375 |
| 2,797,927 | 7/1957 | Raff | 280/40 |
| 2,800,336 | 7/1957 | Major et al. | 280/47.11 |
| 2,884,257 | 4/1959 | Menne | 280/DIG. 2 |
| 2,969,245 | 7/1961 | Wilson | 280/79.1 A |
| 3,666,285 | 5/1972 | Fertig | 280/47.2 |
| 3,729,209 | 4/1973 | Litz | 280/47.2 |
| 3,743,312 | 7/1973 | Gibbons | 280/47.27 |

FOREIGN PATENT DOCUMENTS 2166566 9/1974 Fed. Rep. of Germany ..... 16/18 A
663706 12/1951 United Kingdom ............... 280/47.2

*Primary Examiner*—Joseph F. Peters, Jr.
*Assistant Examiner*—Michael Mar
*Attorney, Agent, or Firm*—Dority & Flint

[57] ABSTRACT

A portable multi-directional hand truck A is illustrated including a frame 10 having a toe plate 14 and a pair of rear indexing wheel assemblies B. Indexing mechanism D is connected between the frame 10 and a contoured wheel C in each wheel assembly having a first position in which wheels C are aligned for forward movement and a second position for movement transverse to the forward movement. Wheels C include a contoured surface 54 for forward movement and a rounded contoured surface 56 for transverse movement. Surface 56 provides a rounded support surface over which the load may be broken and transported in which configuration the load is supported in a raised position for transporting long loads transversely down narrow passageways without dragging and sagging ends of a long load.

9 Claims, 8 Drawing Figures

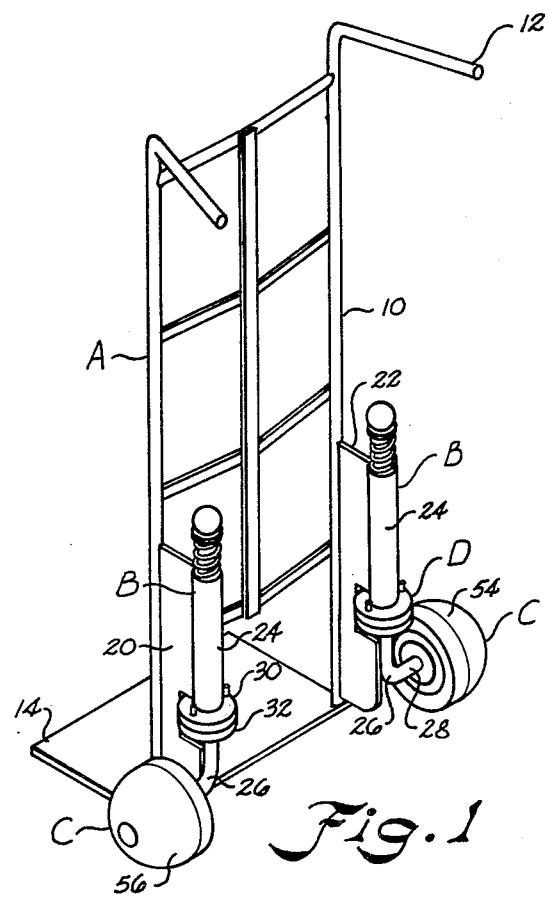
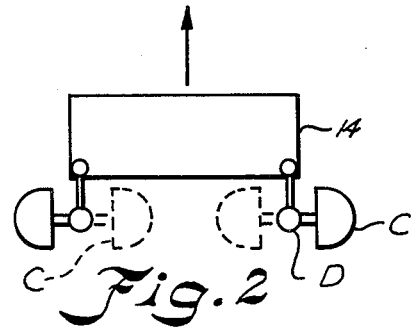
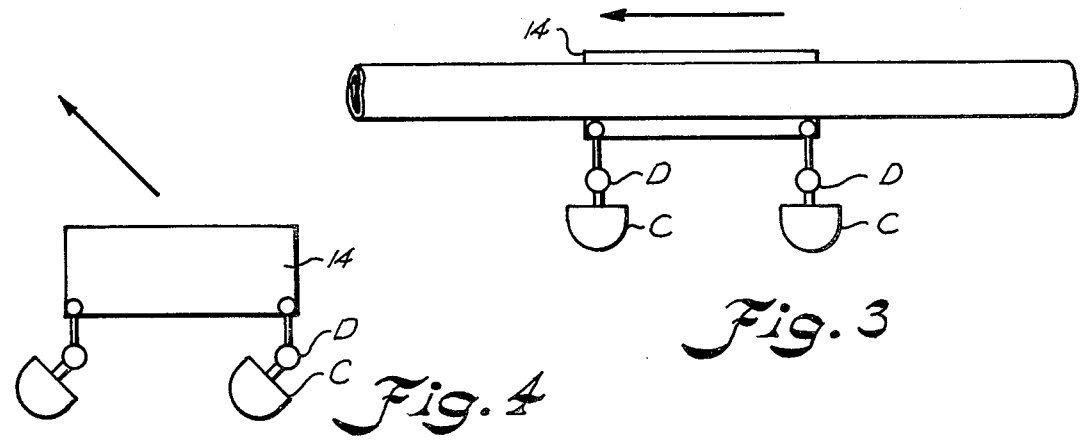

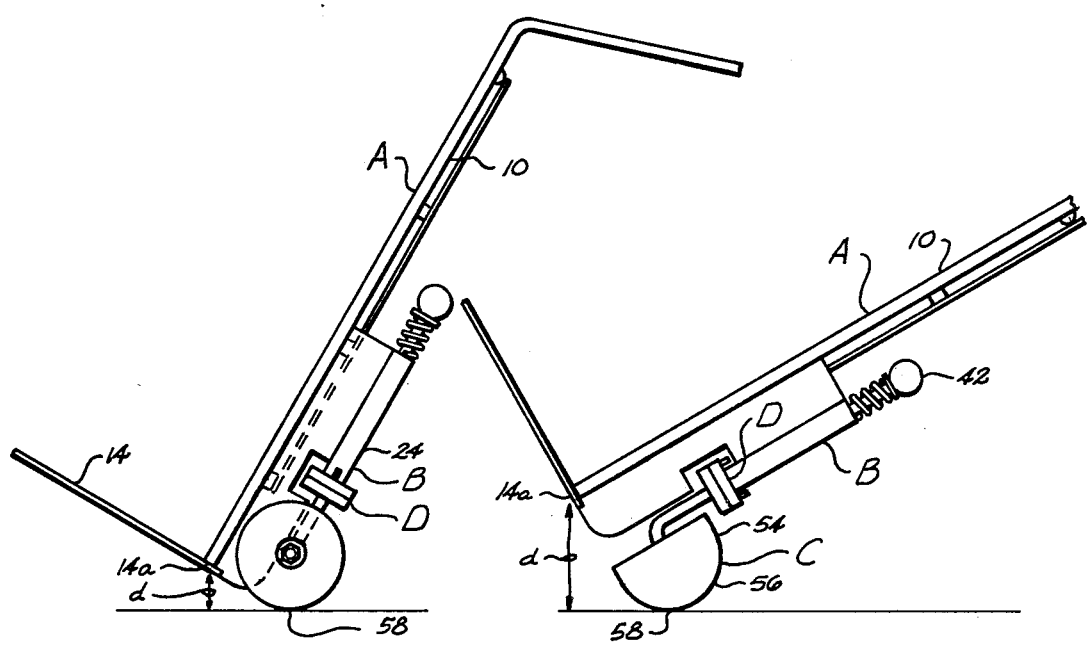
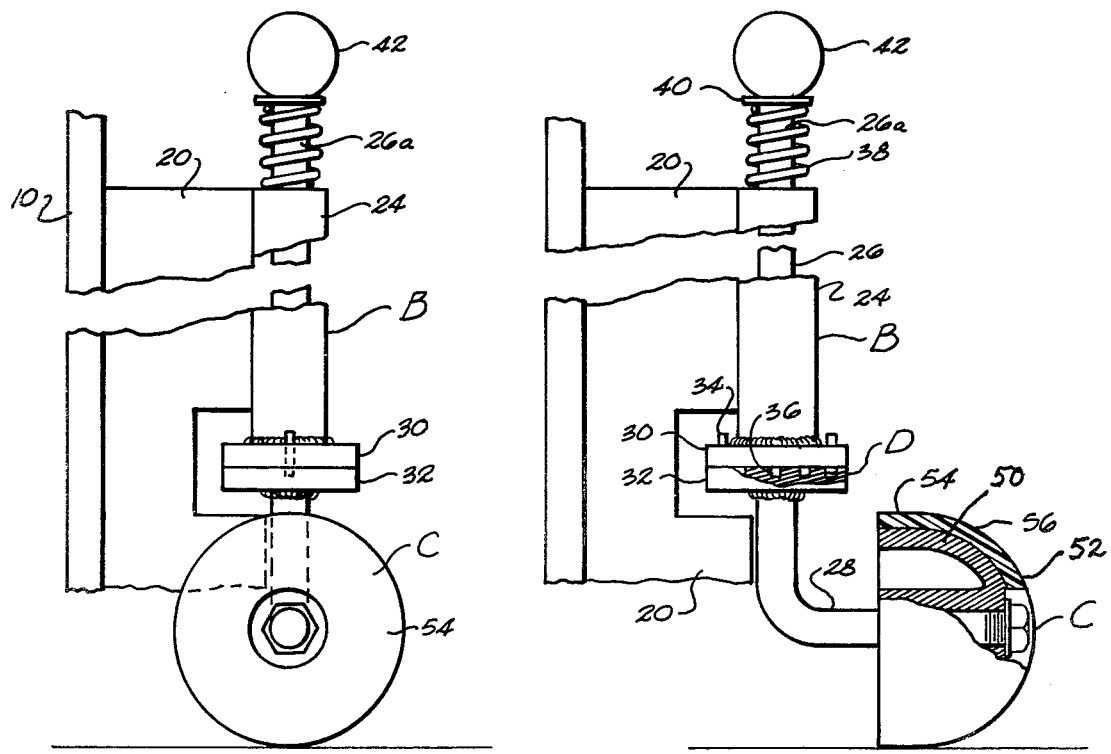

MULTI-DIRECTIONAL PORTABLE HAND TRUCK

BACKGROUND OF THE INVENTION

Portable hand trucks are utilized for moving heavy loads such as appliances, crated articles, and the like which include a pair of rear wheels on which a frame is carried having a cantilevered toe plate on which the load is carried. Some degree of maneuverability is provided by the rear wheels which face forward but the maneuverability is limited in small spaces and for heavy or long loads such as carpet rolled on a hollow tube the maneuverability of conventional hand trucks is severely limited and virtually impossible from a truck or ordinary commercial passageway. Moreover, when a long load is carried on the toe plate of a conventional hand truck, the ends of the load sag and contact the floor making movement difficult. It has often been the practice that two hand trucks are utilized on the ends of a long load in order to move the load down a narrow aisle with one of the hand trucks pushing and one of them pulling the load.

The wheels on conventional hand trucks typically extend past the frame of the hand truck limiting the width of the passageway through which the hand truck may be pushed which also presents a problem in catching on furniture, boxes, and other like articles around which the truck and load need be maneuvered.

In U.S. Pat. No. 3,666,285 a hand truck is disclosed having a means for auxiliary movement of the hand truck which includes a pair of auxiliary wheels which may be pivoted to the floor behind the main wheels so that the hand truck may be moved sideways. However, the problem occurs that when the auxiliary wheels are lowered to the floor, the fulcrum point changes substantially. The fulcrum is changed to a distance of approximately twice that of the original fulcrum about the main wheels. This presents a problem in tilting the truck back to balance the load over the wheels which is commonly referred to as breaking the load. More than twice the force would be required to break the load over the auxiliary wheels. This auxiliary wheel arrangement also is a more complicated and expensive structure and is unwieldy to operate.

U.S. Pat. No. 2,884,257 discloses a foldable hand cart having pivotable wheel assemblies which fold to provide a rack.

Accordingly, an important object of the present invention is to provide a portable hand truck having increased maneuverability which can accommodate a wide variety of load shapes and weights.

Another important object of the present invention is to provide a portable hand truck device which can be utilized to move long loads transversely to the normal direction of movement.

Another important object of the present invention is to provide a portable hand truck having wheel assemblies which support the toe plate of the hand truck in a raised position for movement in a transverse direction relative to a forward direction whereby a long load may be moved in a direction of its axis while the ends are adequately supported above the floor.

Still another object of the present invention is to provide a two-wheeled portable hand truck in which the wheels may be indexed to move in a crabbing direction or a transverse direction to the normal direction of movement.

Still another important object of the present invention is to provide a multi-directional hand truck having a pair of rear wheels which may be indexed to a plurality of positions affording movement of the hand truck in multiple directions providing a highly maneuverable hand truck for accommodating a wide variety of load shapes and sizes in a minimum of space.

SUMMARY OF THE INVENTION

The above objectives are accomplished according to the present invention by providing a portable hand truck having a pair of rear wheels in a generally half-round configuration which may be indexed to a plurality of indexing positions. The hand truck may move forward in one position and the wheels may be indexed to a ninety degree position to move the hand truck transverse to the normal direction. The half-round wheels provide a fulcrum which remains substantially unchanged in breaking the load over the wheels but which displaces the load a greater vertical distance above the floor when in the transverse position to maintain the ends of a long load above the floor sufficiently to prevent them from dragging during movement. The unique shape of the half-round wheels allows the operator to tilt the hand truck rearwardly to any desired degree in order to raise the ends of the long loads sufficiently above the ground while at the same time providing a smooth rolling surface for the hand truck in any of the tilted positions.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a multi-directional portable hand truck constructed in accordance with the present invention;

FIG. 2 is a schematic plan view illustrating a multi-directional hand truck constructed according to the present invention having a pair of wheel assemblies set in a normal forward direction;

FIG. 3 is a schematic plan view of a multi-directional hand truck wherein the wheel assemblies are set in a transverse position for movement transverse to the normal forward movement;

FIG. 4 is a schematic plan view of a multi-directional hand truck according to the invention with the wheel assemblies set in a crabbing position indexed forty-five degrees with respect to the forward position;

FIG. 5 is a side elevation illustrating a multi-directional hand truck constructed according to the present invention with the wheels set in a forward position;

FIG. 6 is a side elevation illustrating a multi-directional hand truck according to the invention with the wheels set in a transverse position;

FIG. 7 is an elevation illustrating a wheel assembly for a multi-directional hand truck according to the invention indexed to a forward position; and FIG. 8 is an elevation partially cut-away illustrating a wheel assembly for a multi-directional hand truck according to the invention indexed to a transverse position.

DESCRIPTION OF A PREFERRED EMBODIMENT

The invention relates to a portable hand truck for moving heavy loads which typically includes a frame, a handle at the top of the frame, and a cantilevered toe plate carried at the bottom of the frame on which a load is carried. A pair of rear wheels are typically carried adjacent the bottom rear of the hand truck extending from the side of the frame. The hand truck is used in many industrial applications for moving heavy loads such as carpet rolls or steel rods as well as in commercial uses such as moving appliances, heavy crated loads, and other like loads.

Referring now to the drawings, a portable hand truck A is disclosed which includes a frame 10 having a pair of top handles 12 and a bottom toe plate 14 which is cantilevered as extending horizontally from the bottom of frame 10. The hand truck is typically of a welded construction.

A pair of rear wheel assemblies B are carried by the frame at the bottom of the frame. The rear wheel assemblies are carried by means of plates 20 and 22 welded to the frame and the wheel assemblies. Each wheel assembly includes a hollow tubular housing 24, welded to the plates 20, 22. Housing 24 slidably and rotatably receives a shaft 26 therethrough which terminates in a perpendicular axle 28 on which a contoured wheel means C is carried.

Each wheel assembly B includes the contoured wheel means C and indexing means D connected between the contoured wheel C and frame plates 20, 22. The contoured wheel means C includes a contoured floor contacting surface which, when in a side rotated position, varies the spacing or displacement of the toe plate, and hence the load supported thereon, above the floor depending on which portion of the contoured surface is contacting the floor.

Indexing means D is provided by an index latch 30 carried by the tubular housing 24 and a bottom index 32 carried by the shaft 26. Indexing pins 34 are carried in the latch 30 and fit in index openings 36 carried in the index 32 both of which are in the form of disk plates. In practice, it is preferred that there be provided eight index openings such that the shaft 26 and wheels C carried thereon may be rotated to any one of a plurality of forty-five degree positions.

Shaft 26 extends through a top of the housing 24 and includes a spring 38 received over a shaft portion 26a which engages a washer 40 retained on the shaft by means of a handle 42. Spring 38 bears against the top of housing 24 at its opposing end. The spring 40 is compressed when the handle 42 is pushed downwardly pushing shaft 26a through the housing 24 to disengage the pins 34 from the index openings 36 so that the wheel may be rotated to any desired position. When the wheel is rotated to the desired forty-five degree position, the handle 42 is released and the spring returns the shaft 26 upwardly so that the index pins are fitted within the desired index opening and wheel C is locked for a desired directional movement. All indexing positions are in reference to the forward position of FIG. 2.

The wheel assembly B attached to plate 22 of the hand truck is constructed in an identical manner.

Referring now to the drawings, it will be seen that the contoured wheels C are preferably constructed of a cast inner member 50 which is preferably aluminum and an outer rubber covering 52 which is vulcanized on the aluminum casting 50. As illustrated, the wheel includes a contoured floor contacting surface which includes a first, generally flat portion 54 and a second, half-round portion 56 having a varying thickness from the axle 28.

With indexing means D in a first position for normal forward movement, the hand truck rides on the flat portion 54 (FIGS. 2, 5, 7). When the wheels C are moved to a second, side-rotated ninety degree position (FIGS. 3, 6, 8), the hand truck may be tilted rearwardly on the contoured surface 56 bearing the load and contacting the floor. Tilting over the contoured round portion 56 provides variable distances between the floor contact point 58 and the toe plate junction 14a to vary the displacement of the load above the floor.

In this tilted position, on contoured portion 56, it will be seen that the toe plate 14 and hand truck frame will be raised above the floor a greater vertical distance, d, than when the wheels are in the forward position and the hand truck is tilted rearwardly with the load balanced over the wheels. The effective floor contact distance, which is defined as the distance from the floor contact point of the wheel to the toe plate junction 14a, is greater when the wheels are indexed to the ninety degree position resulting in a greater vertical displacement of the load above the floor. This enables the operator to tilt the hand truck rearwardly a sufficient amount so that the ends of a long load, such as carpet roll 60, are raised sufficiently above the floor surface and the hand truck may then be moved in the transverse direction on the half-round surface of wheels C to move the load sideways.

Many times it is desirable to move a load away from a wall or other object. In this case, the wheels may be indexed to a desired forty-five degree position in which the hand truck will move in a direction forty-five degrees so that the load may be moved away.

As best seen in FIG. 2, an alternate forward position is provided by means of the wheel assemblies B wherein the wheels C may be rotated one hundred eighty degreees from their normal forward position and occupy a dotted line position witin the width of the hand truck frame 10. In this position, the hand truck may be used in its normal manner but the wheels will be protected from engaging articles outside the path of the hand truck. This is particularly advantageous when the hand truck is used in a narrow passage or is used around furniture or other objects in which it is desirable to protect the furniture and the like from accidental engagement by the hand truck wheels.

In operation, the hand truck need be tilted only slightly forward in order to depress handles 42 sufficiently to move the wheels out of their locked position and rotate them to another locked indexed position. The amount of forward movement would correspond to that normally made on the hand truck in order to slide the toe plate under a load. The amount of movement required would not be such as would create a problem in causing the load to be unbalanced.

While a preferred embodiment of the invention has been described using specific terms, such description is for illustrative purposes only, and it is to be understood that changes and variations may be made without departing from the spirit or scope of the following claims.

What is claimed is:

1. A multi-directional portable hand truck for manually transporting a load comprising:

a generally vertical frame having a handle means carried adjacent one end thereof;

a cantilevered toe plate carried adjacent a bottom end of said frame for assisting in supporting said load on said truck;

a pair of wheel assemblies carried adjacent a lower end of said frame each wheel assembly including contoured wheel means having a generally semi-spherical surface supporting said load and frame above a floor over which said load and frame are moved;

index means connecting said contoured wheel means to said frame for locking said wheel means in a number of rotatable index positions relative to said frame;

said index means having a first position in which said wheel means is aligned relative to said frame for movement in forward directions;

said index means including a second position in which said wheel means is transverse to and aft of said first position for movement in a direction transverse to said forward movement; and support means included in said index means which rotatably attaches the contoured wheel means to said index means; said support means including a vertical axis and a wheel support axis which is generally transverse to said vertical axis for rotatably supporting said wheel means offset from said vertical axis; said support means and contoured wheel means cooperating to support said toe plate of said frame and hence said load above the floor a greater vertical distance when said index means is in said second position and said wheel means are transversely aligned than when said wheel means are forwardly aligned in said first position and tilted to a corresponding degree over said contoured wheels.

2. The device of claim 1 wherein said contoured wheel means includes a round contoured surface which varies the effective floor distance from said toe plate to a floor contact point of said contoured wheel means as said hand truck frame is tilted rearwardly upon said wheel means and said wheels are in said position for said transverse movement.

3. The device of claim 1 wherein said contoured wheel means includes a first surface over which said wheel means rolls for movement in said forward direction and a second surface over which said wheel means rolls for movement in said transverse direction, the distance from a floor contact point of said contoured wheel means to said toe plate being greater from said second surface than said first surface.

4. The device of claim 1 wherein said contoured wheel means includes a first portion over which said wheel means rolls in said first index position and a second portion over which said wheel means rolls in said second index position, said second portion having a diameter less than said first portion.

5. The device of claim 4 wherein said first portion includes a flat lateral surface.

6. The device of claim 1 wherein said index means includes an index latch and an index carried between said frame and wheel means, said index latch and index cooperating to lock said wheel means in a number of rotatable positions relative to said frame.

7. The device of claim 1 wherein said index means including a hollow housing carried by said frame, a shaft slidably and rotatably carried in said hollow housing on which said wheel means is rotatably carried, said index means including an index latch and a cooperating index, said index latch and index locking said housing and shaft together against rotation in any one of a number of index positions.

8. The apparatus of claim 1 wherein said index means includes a third position wherein said wheel means is rotated one-hundred and eighty degrees from said first position so that said wheel means are turned inwardly facing one another and lie within the width of said frame.

9. A portable hand truck for manually transporting a load comprising:

a generally vertical frame having a handle means;

wheel means carried adjacent a lower end of said frame supporting said frame and load above a floor surface; said wheel means including a pair of contoured wheels each said wheel including a generally semi-spherical load supporting surface;

adjustable index means connecting each said wheel to said frame locking each said wheel in a number of rotated positions relative to said frame;

said index means having a first index position in which each said wheel is in a forward alignment for movement in a forward direction;

said index means having a second index position in which each said wheel is rotated generally ninety degrees from said first position for movement transverse to said forward direction;

support means included in said index means including a vertical axis and a generally transverse axis rotatably supporting each said wheel, each said contoured wheel including a first portion having a generally flat lateral surface over which said wheel rolls in said forward direction and a second portion over which said wheel rolls in said transverse direction, said second portion having a diameter less than said first portion, wherein said first and second portions are offset from said vertical axis.

* * * * *